US012127152B2

(12) United States Patent
Arora et al.

(10) Patent No.: US 12,127,152 B2
(45) Date of Patent: Oct. 22, 2024

(54) AUTHORIZATION FOR USER EQUIPMENT SUPPORTING RANGING BASED SERVICES

(71) Applicant: QUALCOMM Incorporated, San Diego, CA (US)

(72) Inventors: Mayank Arora, Hyderabad (IN); Ankit Kumar, Hyderabad (IN); Rajat Aggarwal, Telangana (IN); Amar Kumar Nandan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/805,998

(22) Filed: Jun. 8, 2022

(65) Prior Publication Data
US 2023/0403669 A1    Dec. 14, 2023

(51) Int. Cl.
*H04W 60/04*    (2009.01)
*H04W 12/04*    (2021.01)
*H04W 76/11*    (2018.01)
*H04W 76/20*    (2018.01)

(52) U.S. Cl.
CPC ........... *H04W 60/04* (2013.01); *H04W 12/04* (2013.01); *H04W 76/11* (2018.02); *H04W 76/20* (2018.02)

(58) Field of Classification Search
None
See application file for complete search history.

(56) References Cited

U.S. PATENT DOCUMENTS

2016/0134418 A1\*  5/2016  Liu .................. H04W 12/0431
                                                  713/171

\* cited by examiner

*Primary Examiner* — Kenneth B Wells
(74) *Attorney, Agent, or Firm* — Harrity & Harrity, LLP

(57) ABSTRACT

Various aspects of the present disclosure generally relate to wireless communication. In some aspects, a first user equipment (UE) may receive a registration message including a decode key associated with a ranging service. The UE may receive, from a second UE, an encoded value and an identifier associated with the second UE. The UE may validate the identifier using the encoded value and the decode key. The UE may establish a ranging session associated with the second UE based at least in part on validating the identifier. Numerous other aspects are described.

30 Claims, 11 Drawing Sheets

| 8 | 7 | 6 | 5 | 4 | 3 | 2 | 1 | |
|---|---|---|---|---|---|---|---|---|
| Ranging identity IEI ||||||||  Octet 1 |
| Length of Ranging identity contents |||||||| Octet 2 |
| ^ |||||||| Octet 3 |
| PC5_UE_Id |||||||| Octet 4 |
| PC5_UE_Id (continued) |||||||| Octet 5 |
| Auth_code |||||||| Octet 6 |
| Auth_code (continued) |||||||| Octet 7 |
| DecodeKey |||||||| Octet 8 |
| DecodeKey (continued) |||||||| Octet 9 |

FIG. 7

AUTHORIZATION FOR USER EQUIPMENT SUPPORTING RANGING BASED SERVICES

FIELD OF THE DISCLOSURE

Aspects of the present disclosure generally relate to wireless communication and to techniques and apparatuses for authorization for user equipment (UEs) supporting ranging based services.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first user equipment may include a memory and one or more processors coupled to the memory. The one or more processors may be configured to receive a registration message including a decode key associated with a ranging service. The one or more processors may be configured to receive, from a second UE, an encoded value and an identifier associated with the second UE. The one or more processors may be configured to validate the identifier using the encoded value and the decode key. The one or more processors may be configured to establish a ranging session associated with the second UE based at least in part on validating the identifier.

Some aspects described herein relate to a network node for wireless communication. The network node may include a memory and one or more processors coupled to the memory. The one or more processors may be configured to receive, from a UE, an indication that the UE supports a ranging service. The one or more processors may be configured to transmit, based at least in part on the indication, a registration message including a decode key associated with the ranging service, an identifier associated with the UE, and an encoded value based at least in part on the decode key.

Some aspects described herein relate to a method of wireless communication performed by a first UE. The method may include receiving a registration message including a decode key associated with a ranging service. The method may include receiving, from a second UE, an encoded value and an identifier associated with the second UE. The method may include validating the identifier using the encoded value and the decode key. The method may include establishing a ranging session associated with the second UE based at least in part on validating the identifier.

Some aspects described herein relate to a method of wireless communication performed by a network node. The method may include receiving, from a UE, an indication that the UE supports a ranging service. The method may include transmitting, based at least in part on the indication, a registration message including a decode key associated with the ranging service, an identifier associated with the UE, and an encoded value based at least in part on the decode key.

Some aspects described herein relate to a non-transitory computer-readable medium that stores a set of instructions for wireless communication by a first UE. The set of instructions, when executed by one or more processors of the UE, may cause the UE to receive a registration message including a decode key associated with a ranging service. The set of instructions, when executed by one or more processors of the UE, may cause the UE to receive, from a second UE, an encoded value and an identifier associated with the second UE. The set of instructions, when executed by one or more processors of the UE, may cause the UE to validate the identifier using the encoded value and the decode key. The set of instructions, when executed by one or more processors of the UE, may cause the UE to establish a ranging session associated with the second UE based at least in part on validating the identifier.

Some aspects described herein relate to a non-transitory computer-readable medium that stores a set of instructions for wireless communication by a network node. The set of instructions, when executed by one or more processors of the network node, may cause the network node to receive, from a UE, an indication that the UE supports a ranging service. The set of instructions, when executed by one or more processors of the network node, may cause the network node to transmit, based at least in part on the indication, a registration message including a decode key associated with the ranging service, an identifier associated with the UE, and an encoded value based at least in part on the decode key.

Some aspects described herein relate to an apparatus for wireless communication. The apparatus may include means for receiving a registration message including a decode key associated with a ranging service. The apparatus may include means for receiving, from a second UE, an encoded value and an identifier associated with the second UE. The apparatus may include means for validating the identifier using the encoded value and the decode key. The apparatus may include means for establishing a ranging session associated with the second UE based at least in part on validating the identifier.

Some aspects described herein relate to an apparatus for wireless communication. The apparatus may include means for receiving, from a UE, an indication that the UE supports a ranging service. The apparatus may include means for transmitting, based at least in part on the indication, a registration message including a decode key associated with the ranging service, an identifier associated with the UE, and an encoded value based at least in part on the decode key.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a registration message, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
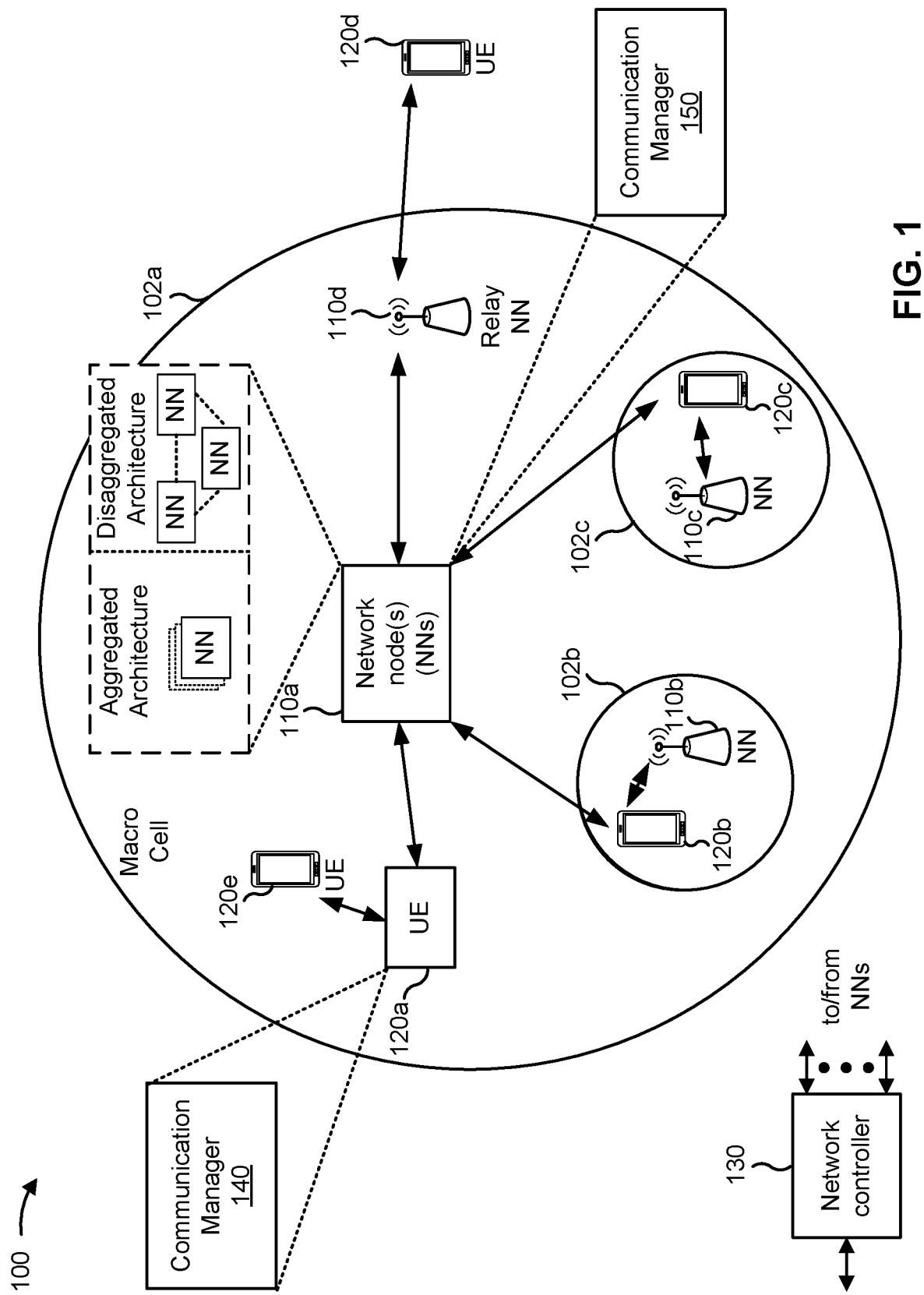
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a registration message including a decode key associated with a ranging service; receive, from a second UE, an encoded value and an identifier associated with the second UE; validate the identifier using the encoded value and the decode key; and establish a ranging session associated with the second UE based at least in part on validating the identifier. Additionally, or alternatively, the communication manager 140 may perform one or more other operations described herein.

In some aspects, the network node 110 may include a communication manager 150. As described in more detail elsewhere herein, the communication manager 150 may receive, from a UE, an indication that the UE supports a ranging service; and transmit, based at least in part on the indication, a registration message including a decode key associated with the ranging service, an identifier associated with the UE, and an encoded value based at least in part on the decode key. Additionally, or alternatively, the communication manager 150 may perform one or more other operations described herein.

As indicated above, FIG. 1 is provided as an example. Other examples may differ from what is described with regard to FIG. 1.

Figure 2:
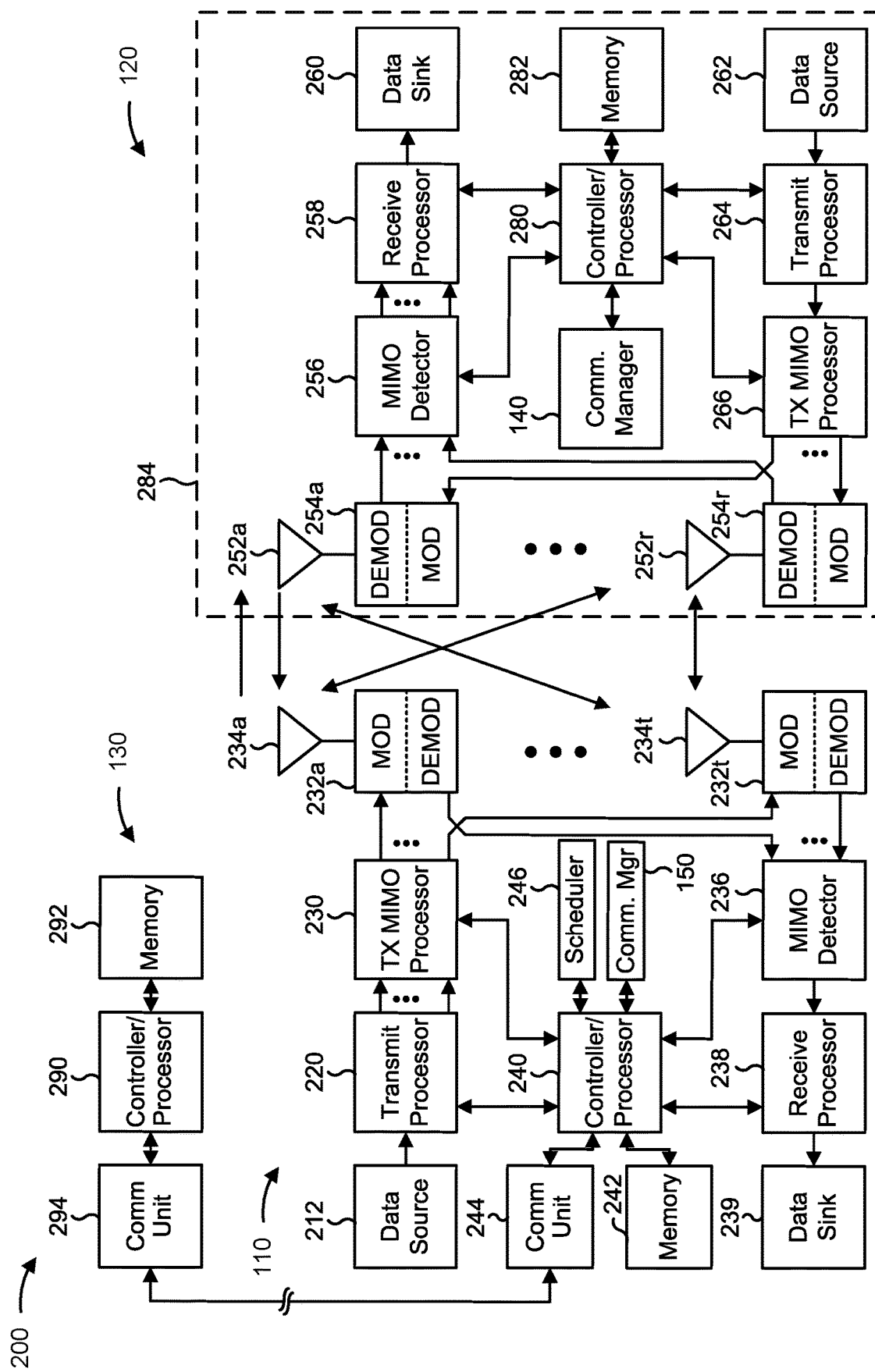
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the network node 110, the controller/processor 280 of the UE 120, and/or any other component(s) of FIG. 2 may perform one or more techniques associated with ranging, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a registration message including a decode key associated with a ranging service; means for receiving, from a second UE, an encoded value and an identifier associated with the second UE; means for validating the identifier using the encoded value and the decode key; and/or means for establishing a ranging session associated with the second UE based at least in part on validating the identifier. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, from a UE, an indication that the UE supports a ranging service; and/or means for transmitting, based at least in part on the indication, a registration message including a decode key associated with the ranging service, an identifier associated with the UE, and an encoded value based at least in part on the decode key. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
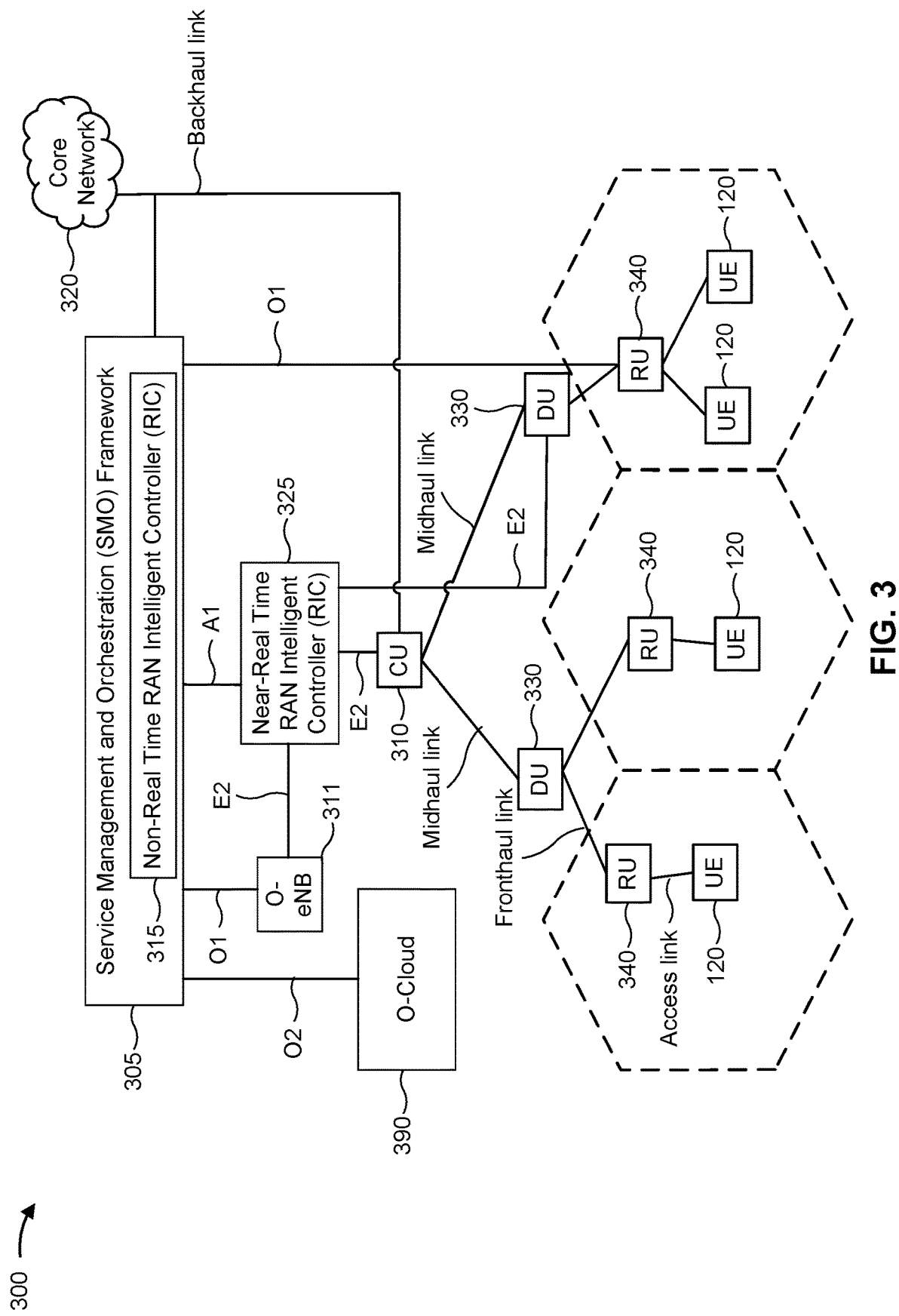
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
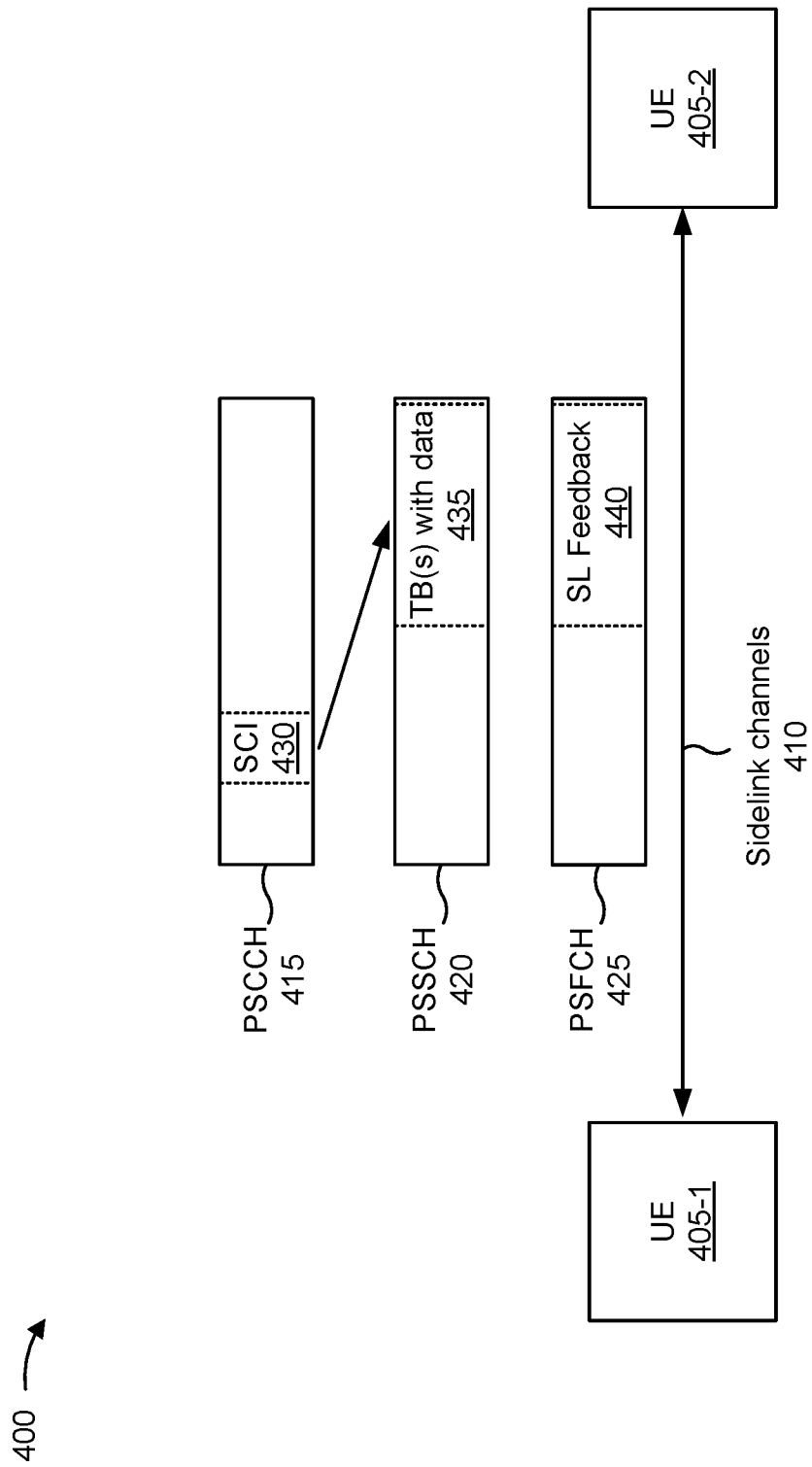
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110. For example, the UE 405 may receive a grant (e.g., in downlink control information (DCI) or in an RRC message, such as for configured grants) from the network node 110 for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
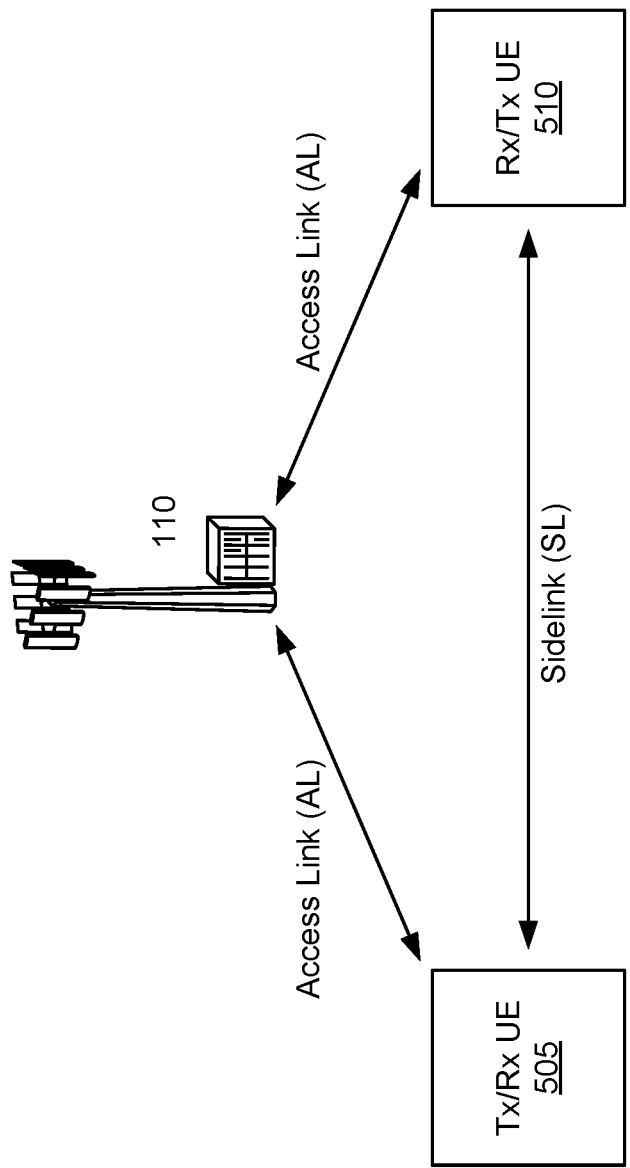
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 via a first access link. Additionally, or alternatively, in some sidelink modes, the network node 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Some UEs, such as UEs performing UE-to-UE communication (e.g., sidelink UEs, UE 120, UE 405, UE 505, UE 510) may be capable of utilizing a ranging service. A ranging service is associated with a ranging determination for a UE. "Ranging" refers to the determination of the distance between two UEs and/or the direction (e.g., relative location and/or direction vector) of one UE relative to another UE. Ranging may be performed via a direct communication link. Ranging services may utilize the distance between UEs and/or the direction of one UE from another UE.

In some circumstances, a network operator may wish to control which UEs can utilize a ranging service. For example, a network operator may provide access to licensed spectrum, which is under the control of the network operator. Ranging operations, in some examples, may involve some amount of signaling, overhead, and interference for nearby UEs, as do many forms of wireless communications. However, UEs performing ranging services (such as sidelink UEs) may sometimes be out of network coverage, meaning that a wireless system (e.g., a 5G system) may have difficulty controlling usage of or access to ranging services. For example, a wireless system that controls usage of or access to ranging services directly (e.g., as the usage or access is performed) may not be able to control usage of or access to ranging services while UEs are out of coverage. This may lead to unauthorized access to or usage of ranging, unwanted interference, and/or failure to adequately control ranging access, particularly in licensed spectrum.

Some techniques described herein provide signaling of a decode key associated with a ranging service to a first UE. The decode key may be usable by the first UE to decode an encoded value associated with an identifier received from a second UE. The encoded value and the identifier may be received in association with establishing a ranging session between the first UE and the second UE. The first UE may validate the received identifier using the encoded value and the decode key, and the first UE may establish a ranging session associated with the second UE if the identifier is successfully validated. In some aspects, the decode key (and/or an identifier and/or encoded value associated with the first UE) may be provided during registration with the 5G system, such that the decode key, the identifier, and/or the encoded value can be used for validation associated with ranging sessions even while out of coverage of the system. For example, the first UE and the second UE can exchange and validate respective encoded values and identifiers irrespective of whether the first UE and the second UE are in radio access network coverage, which enables control of access to ranging of services (such as in licensed spectrum) irrespective of whether the first UE and the second UE are in coverage. Thus, unwanted interference may be reduced.

Figure 6:
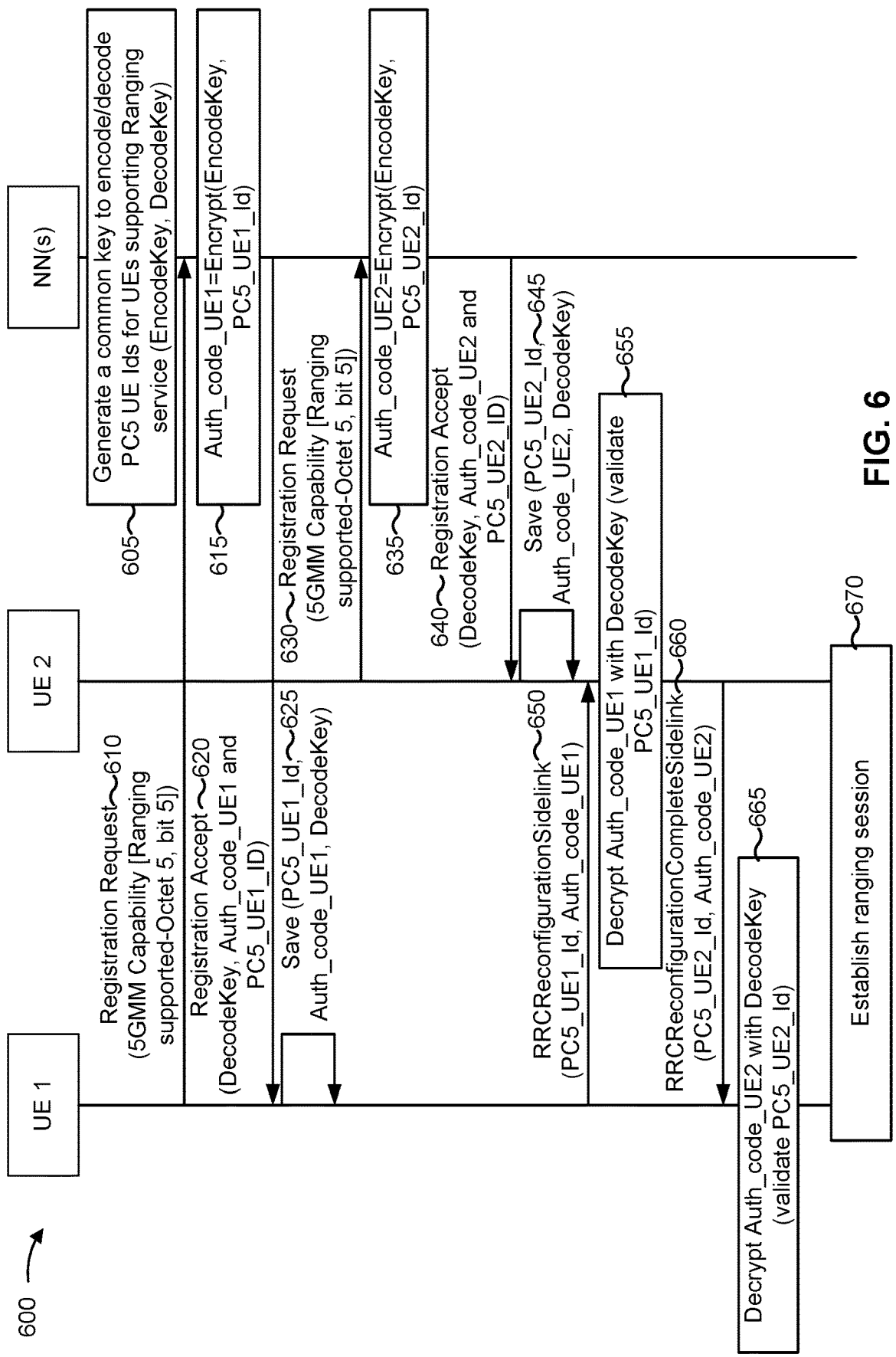
FIG. 6 is a diagram illustrating an example of validation for UEs supporting ranging services, in accordance with the present disclosure.

FIG. 6 is a diagram illustrating an example 600 of validation for UEs supporting ranging services, in accordance with the present disclosure. Example 600 includes a UE 1 (e.g., UE 120, UE 405, UE 505, or UE 510, and referred to hereinafter as a first UE), a UE 2 (e.g., UE 120, UE 405, UE 505, or UE 510, and referred to hereinafter as a second UE), and a network node (e.g., network node 110, network controller 130). In some aspects, the network node may include a plurality of network nodes, which may be implemented in an aggregated fashion or a disaggregated fashion, as described above. In some aspects, the network node may include a core network device. In some aspects, the network node may include or be a component of a 5G system.

As shown by reference number 605, the network node may generate a set of keys associated with a ranging service. For example, the network node may generate an encode key and a decode key. In some aspects, the encode key and the decode key may be an asymmetric key pair. In some aspects, the set of keys may be associated with the ranging service based on the set of keys being usable for encoding and decoding of identifiers associated with accessing the ranging service or establishing a ranging session associated with the ranging service. A ranging session may be associated with a ranging service if the ranging session involves the determination of ranging information usable by the ranging service, or the determination of ranging information by the ranging service. A decode key, of an asymmetric key pair, is a key that can be used to decode (e.g., decrypt) an encoded value that is encoded (e.g., encrypted) using an encoded key of the asymmetric key pair. In some aspects, the decode key and the encode key may be cryptographic keys.

As shown by reference number 610, the first UE may transmit a registration request message to the network node.

In some aspects, as shown, the registration request message may include an indication that the first UE supports the ranging service. For example, the registration request message may include capability information (e.g., UE capability information, UE sidelink capability information, 5G mobility management (5GMM) capability information, or the like) indicating that the first UE supports one or more ranging services. In some aspects, the indication may include one or more bits of an octet of a non-access stratum information element, where a first value of the one or more bits indicates that the first UE has a capability for ranging based services and a second value of the one or more bits indicates that the first UE does not have a capability for ranging based services. In some aspects, the indication may be provided separately from the registration request message, such as via RRC signaling.

As shown by reference number 615, the network node may generate an encoded value (shown as Auth_code_UE1) for the first UE. In some aspects, the network node may generate an identifier (shown as PC5_UE1_Id) for the first UE. In some other aspects, the network node may receive the identifier for the first UE. The network node may generate the encoded value by encoding the identifier for the first UE using the encode key. For example, the encoded value may be a version of the identifier that is encoded using an encode key associated with the decode key that can decode the encoded value.

As shown by reference number 620, the network node may transmit, and the first UE may receive, a registration message (e.g., a registration accept message). For example, the network node may transmit the registration message including the decode key, the identifier associated with the UE (e.g., PC5_UE1_Id), and the encoded value (e.g., Auth_code_UE1) (which is based at least in part on the decode key). The network node may transmit the registration message including the decode key, the identifier, and the encoded value based at least in part on the indication that the first UE supports the ranging service.

FIG. 7 is a diagram illustrating an example 700 of a registration message, in accordance with the present disclosure. As shown, example 700 includes a ranging identity information element (IE) index, an indication of a length of content of the ranging identity, an identifier of a UE (PC5_UE_Id), an encoded value (Auth_code), and/or a decode key (DecodeKey). As shown by reference number 625 of FIG. 6, the first UE may save (e.g., store) the identifier, the encoded value, and the decode key.

As shown by reference number 630, the second UE may transmit a registration request message to the network node. In some aspects, as shown, the registration request message may include an indication that the second UE supports the ranging service. For example, the registration request message may include capability information (e.g., UE capability information, UE sidelink capability information, 5GMM capability information, or the like) indicating that the second UE supports one or more ranging services. In some aspects, the indication may include one or more bits of an octet of a non-access stratum information element, where a first value of the one or more bits indicates that the second UE has a capability for ranging based services and a second value of the one or more bits indicates that the second UE does not have a capability for ranging based services. In some aspects, the indication may be provided separately from the registration request message, such as via RRC signaling.

As shown by reference number 635, the network node may generate an encoded value (shown as Auth_code_UE2) for the second UE. In some aspects, the network node may generate an identifier (shown as PC5_UE2_Id) for the second UE. In some other aspects, the network node may receive the identifier for the second UE. The network node may generate the encoded value by encoding the identifier for the second UE using the encode key. For example, the encoded value may be a version of the identifier that is encoded using an encode key associated with the decode key that can decode the encoded value.

As shown by reference number 640, the network node may transmit, and the second UE may receive, a registration message (e.g., a registration accept message, as described in connection with FIG. 7). For example, the network node may transmit the registration message including the decode key, the identifier associated with the UE (e.g., PC5_UE2_Id), and the encoded value (e.g., Auth_code_UE2) (which is based at least in part on the decode key). The network node may transmit the registration message including the decode key, the identifier, and the encoded value based at least in part on the indication that the second UE supports the ranging service. As shown by reference number 645, the second UE may save (e.g., store) the identifier, the encoded value, and the decode key.

As shown by reference number 650, the first UE may transmit, and the second UE may receive, the encoded value (e.g., Auth_code_UE1) and the identifier (e.g., PC5_UE1_Id) associated with the first UE. For example, the first UE may transmit the encoded value and the identifier in a communication associated with ranging session initialization, such as a radio resource control reconfiguration (e.g., RRCReconfigurationSidelink) message. The communication may include one or more information elements indicating the encoded value and the identifier. In some aspects, the first UE may transmit the encoded value and the identifier without an active connection with the network node. For example, the first UE may transmit the encoded value and the identifier while out of coverage of the network node or a network associated with the network node. Thus, techniques described herein provide validation of ranging service access while out of coverage of the network node.

As shown by reference number 655, the second UE may validate the identifier using the encoded value and the decode key. For example, the second UE may decode (e.g., decrypt) the encoded value using the decode key received from the network node, thereby obtaining a decoded value. The second UE may determine whether the identifier associated with the first UE (received at reference number 655) matches the decoded value. If the identifier and the decoded value match, the second UE may successfully validate the identifier associated with the first UE. If the identifier and the decoded value do not match, the second UE may fail to validate the first UE. If the second UE fails to validate the first UE, the second UE may transmit a reject message to the first UE and/or may not proceed to the operations shown by reference numbers 660, 665, and 670.

As shown by reference number 660, the second UE may transmit, and the first UE may receive, the encoded value (e.g., Auth_code_UE2) and the identifier (e.g., PC5_UE2_Id) associated with the second UE. For example, the second UE may transmit the encoded value and the identifier based at least in part on successfully validating the identifier. In some aspects, the first UE may transmit the encoded value and the identifier in a communication associated with ranging session initialization, such as a radio resource control reconfiguration complete (e.g., RRCReconfigurationCompleteSidelink) message. The communication may include one or more information elements indicating the encoded value and the identifier. In some aspects, the second UE may transmit the encoded value and the identifier without an active connection with the network node. For example, the second UE may transmit the encoded value and the identifier while out of coverage of the network node or a network associated with the network node. Thus, techniques described herein provide validation of ranging service access while out of coverage of the network node.

As shown by reference number 665, the first UE may validate the identifier using the encoded value and the decode key. For example, the first UE may decode (e.g., decrypt) the encoded value using the decode key received from the network node, thereby obtaining a decoded value. The first UE may determine whether the identifier associated with the second UE (received at reference number 660) matches the decoded value. If the identifier and the decoded value match, the first UE may successfully validate the identifier associated with the second UE. If the identifier and the decoded value do not match, the first UE may fail to validate the second UE. If the first UE fails to validate the second UE, the first UE may transmit a reject message to the second UE and/or may not proceed to the operation shown by reference number 670.

In some aspects, successfully validating a UE (e.g., the first UE or the second UE) may include or be associated with authorizing the UE. For example, based at least in part on successfully validating the first UE, the second UE may authorize the first UE to establish a ranging session with the second UE. As another example, based at least in part on successfully validating the second UE, the first UE may authorize the second UE to establish a ranging session with the first UE.

As shown by reference number 670, the first UE and the second UE may establish a ranging session. For example, the first UE and the second UE may reconfigure an RRC connection (e.g., a sidelink connection) to be or to support a ranging session. In some aspects, the first UE and/or the second UE may perform ranging via the ranging session. In some aspects, the first UE and/or the second UE may utilize one or more ranging services (e.g., one or more ranging based services) based at least in part on the ranging session. For example, the one or more ranging services may utilize ranging information generated in association with the ranging session. As another example, the one or more ranging services may generate ranging information in association with the ranging session. In this way, the first UE and the second UE can exchange and validate respective encoded values and identifiers irrespective of whether the first UE and the second UE are in radio access network coverage, which enables control of access to ranging of services (such as in licensed spectrum) irrespective of whether the first UE and the second UE are in coverage. Thus, unwanted interference may be reduced.

As indicated above, FIGS. 6 and 7 are provided as examples. Other examples may differ from what is described with regard to FIGS. 6 and 7.

Figure 8:
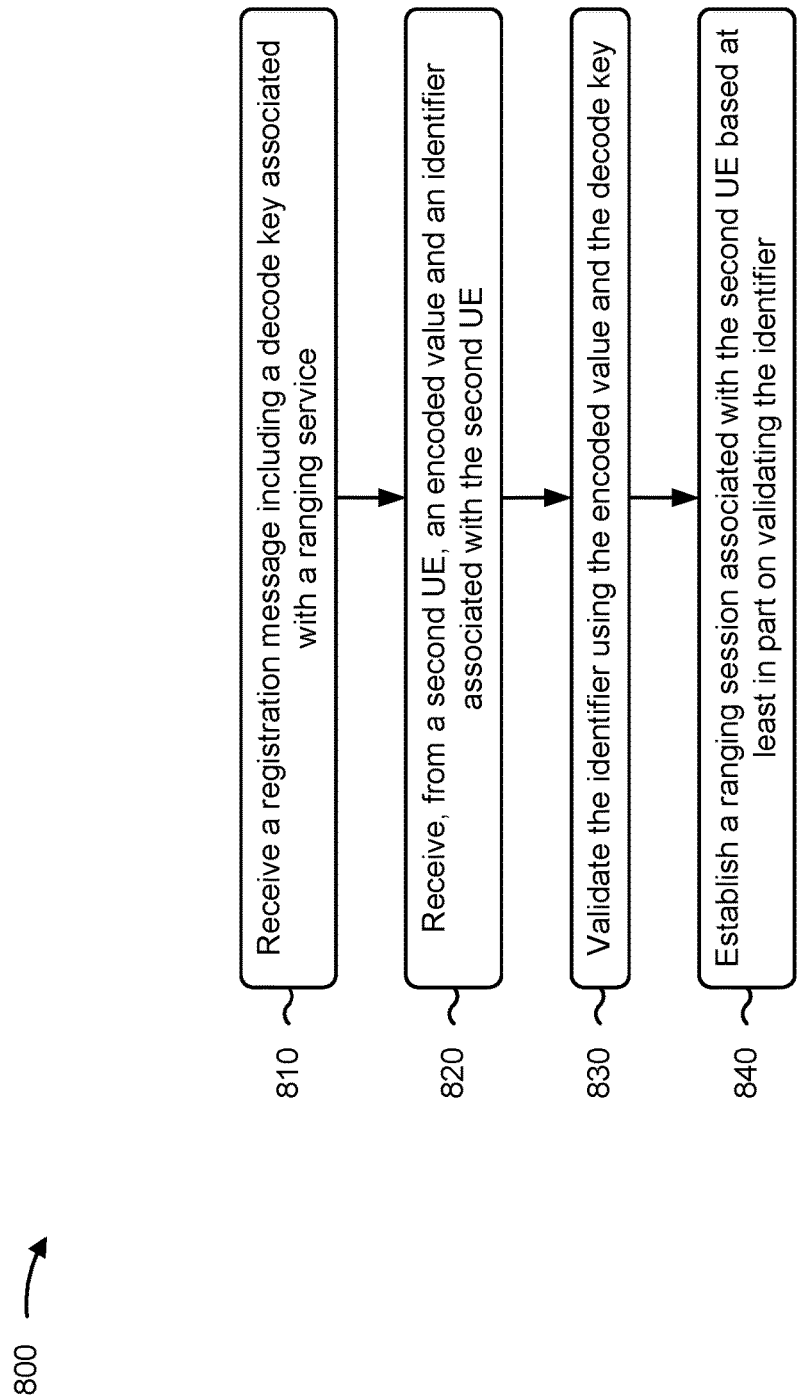
FIG. 8 is a diagram illustrating an example process performed, for example, by a first UE, in accordance with the present disclosure.

FIG. 8 is a diagram illustrating an example process 800 performed, for example, by a first UE, in accordance with the present disclosure. Example process 800 is an example where the first UE (e.g., UE 120, UE 405, UE 505, UE 510, the first UE or the second UE of FIGS. 6 and 7) performs operations associated with authorization for user equipment supporting ranging based services.

As shown in FIG. 8, in some aspects, process 800 may include receiving a registration message including a decode key associated with a ranging service (block 810). For example, the first UE (e.g., using communication manager 140 and/or reception component 1002, depicted in FIG. 10) may receive a registration message including a decode key associated with a ranging service, as described above.

As further shown in FIG. 8, in some aspects, process 800 may include receiving, from a second UE, an encoded value and an identifier associated with the second UE (block 820). For example, the first UE (e.g., using communication manager 140 and/or reception component 1002, depicted in FIG. 10) may receive, from a second UE, an encoded value and an identifier associated with the second UE, as described above.

As further shown in FIG. 8, in some aspects, process 800 may include validating the identifier using the encoded value and the decode key (block 830). For example, the first UE (e.g., using communication manager 140 and/or validation component 1008, depicted in FIG. 10) may validate the identifier using the encoded value and the decode key, as described above.

As further shown in FIG. 8, in some aspects, process 800 may include establishing a ranging session associated with the second UE based at least in part on validating the identifier (block 840). For example, the first UE (e.g., using communication manager 140 and/or ranging component 1010, depicted in FIG. 10) may establish a ranging session associated with the second UE based at least in part on validating the identifier, as described above.

Process 800 may include additional aspects, such as any single aspect or any combination of aspects described below and/or in connection with one or more other processes described elsewhere herein.

In a first aspect, the registration message including the decode key is based at least in part on an indication that the first UE supports the ranging service.

In a second aspect, alone or in combination with the first aspect, receiving the encoded value and the identifier is based at least in part on an indication that the first UE supports the ranging service.

In a third aspect, alone or in combination with one or more of the first and second aspects, the encoded value and the identifier are received in a communication associated with ranging session initialization.

In a fourth aspect, alone or in combination with one or more of the first through third aspects, validating the identifier further comprises decoding the encoded value using the decode key to obtain a decoded value, and determining that the identifier associated with the second UE matches the decoded value.

In a fifth aspect, alone or in combination with one or more of the first through fourth aspects, the identifier is a second identifier and the encoded value is a second encoded value, and wherein the registration message includes a first identifier associated with the first UE and a first encoded value associated with the first UE.

In a sixth aspect, alone or in combination with one or more of the first through fifth aspects, process 800 includes transmitting the first identifier and the first encoded value to the second UE based at least in part on validating the identifier.

In a seventh aspect, alone or in combination with one or more of the first through sixth aspects, the first identifier and the first encoded value are transmitted via a radio resource control reconfiguration complete communication.

In an eighth aspect, alone or in combination with one or more of the first through seventh aspects, the identifier and the encoded value are received via a radio resource control reconfiguration communication.

In a ninth aspect, alone or in combination with one or more of the first through eighth aspects, receiving the encoded value and the identifier further comprises receiving the encoded value and the identifier without an active connection with a network node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
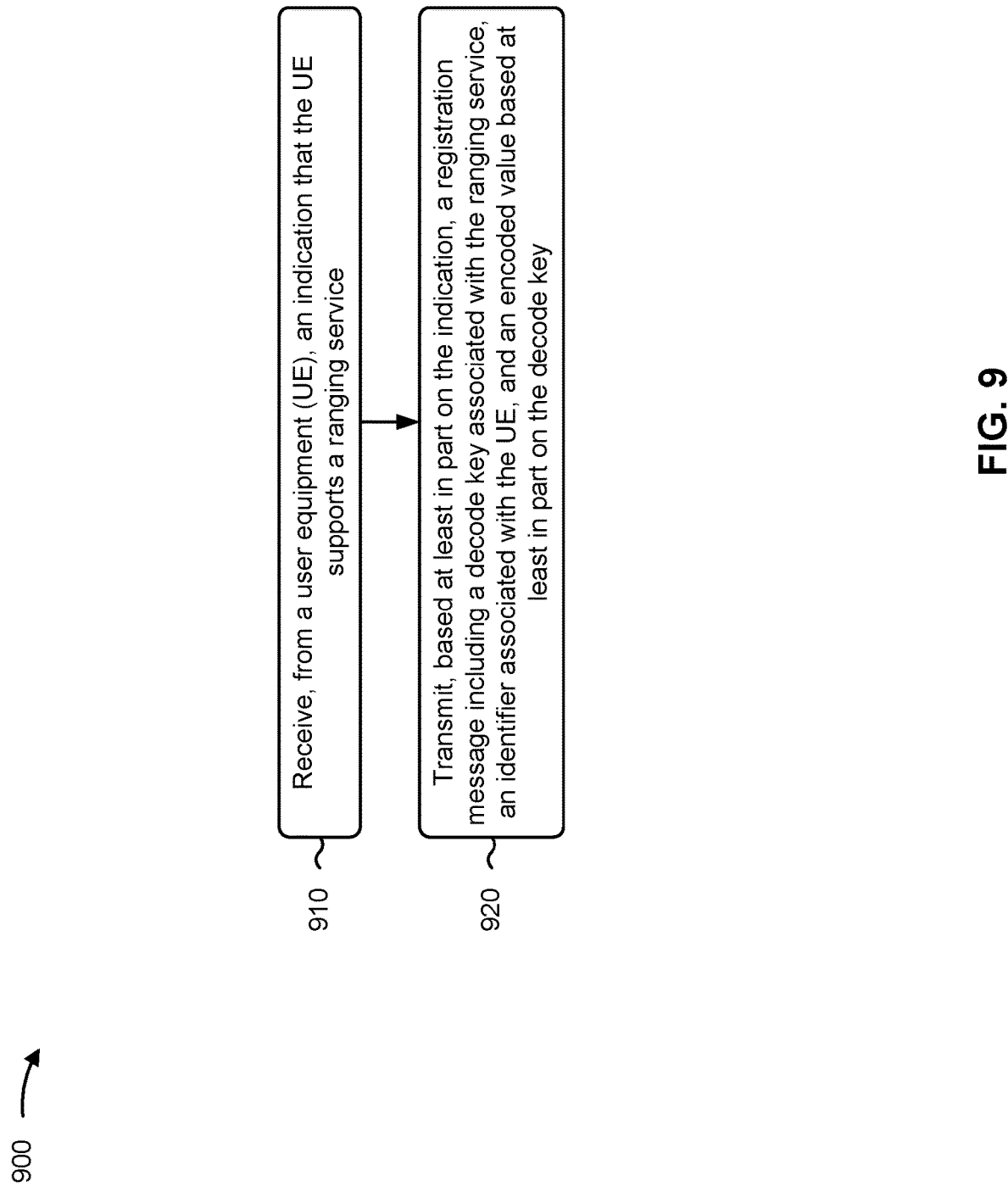
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110, the network node of FIGS. 6 and 7) performs operations associated with authorization for user equipment supporting ranging based services.

As shown in FIG. 9, in some aspects, process 900 may include receiving, from a UE, an indication that the UE supports a ranging service (block 910). For example, the network node (e.g., using communication manager 150 and/or reception component 1102, depicted in FIG. 11) may receive, from a UE, an indication that the UE supports a ranging service, as described above.

As further shown in FIG. 9, in some aspects, process 900 may include transmitting, based at least in part on the indication, a registration message including a decode key associated with the ranging service, an identifier associated with the UE, and an encoded value based at least in part on the decode key (block 920). For example, the network node (e.g., using communication manager 150 and/or transmission component 1104, depicted in FIG. 11) may transmit, based at least in part on the indication, a registration message including a decode key associated with the ranging service, an identifier associated with the UE, and an encoded value based at least in part on the decode key, as described above.

Process 900 may include additional aspects, such as any single aspect or any combination of aspects described below and/or in connection with one or more other processes described elsewhere herein.

In a first aspect, the encoded value is a version of the identifier encoded using an encode key associated with the decode key.

In a second aspect, alone or in combination with the first aspect, process 900 includes generating at least one of the encode key, the decode key, or the identifier.

In a third aspect, alone or in combination with one or more of the first and second aspects, the indication is received via capability information.

In a fourth aspect, alone or in combination with one or more of the first through third aspects, the identifier is a first identifier, and the encoded value is a first encoded value, and wherein the method further comprises transmitting, to a second UE, a second registration message including the decode key, a second identifier associated with the second UE, and a second encoded value based at least in part on an encode key associated with the decode key.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
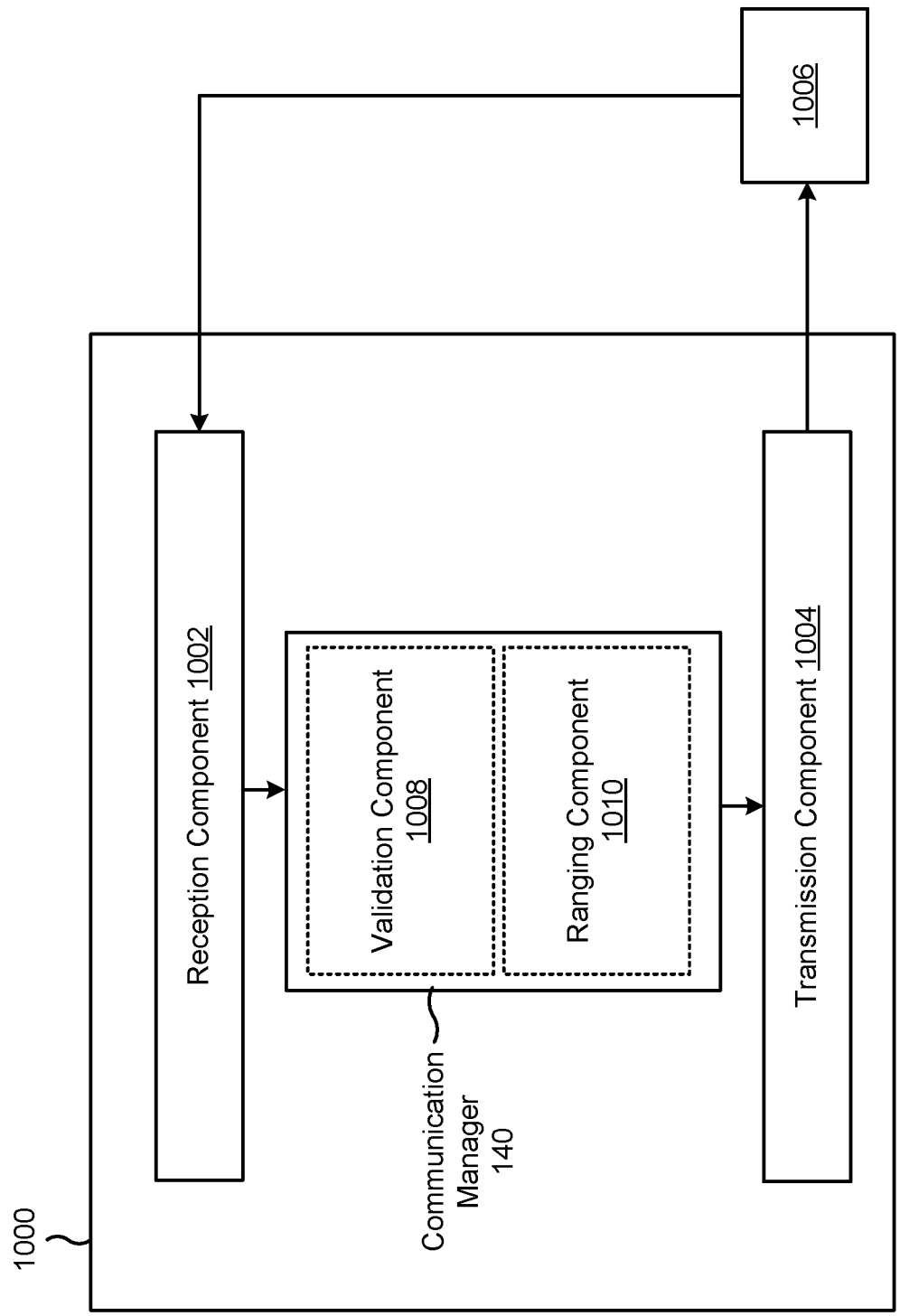
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a validation component 1008, or a ranging component 1010, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2. In some aspects, the reception component 1002 may include an interface that communicates with a network node having one or more radio frequency components, such as a radio unit.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver. In some aspects, the transmission component 1004 may include an interface that communicates with a network node having one or more radio frequency components, such as a radio unit.

The reception component 1002 may receive a registration message including a decode key associated with a ranging service. The reception component 1002 may receive, from a second UE, an encoded value and an identifier associated with the second UE. The validation component 1008 may validate the identifier using the encoded value and the decode key. The ranging component 1010 may establish a ranging session associated with the second UE based at least in part on validating the identifier.

The transmission component 1004 may transmit the first identifier and the first encoded value to the second UE based at least in part on validating the identifier.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
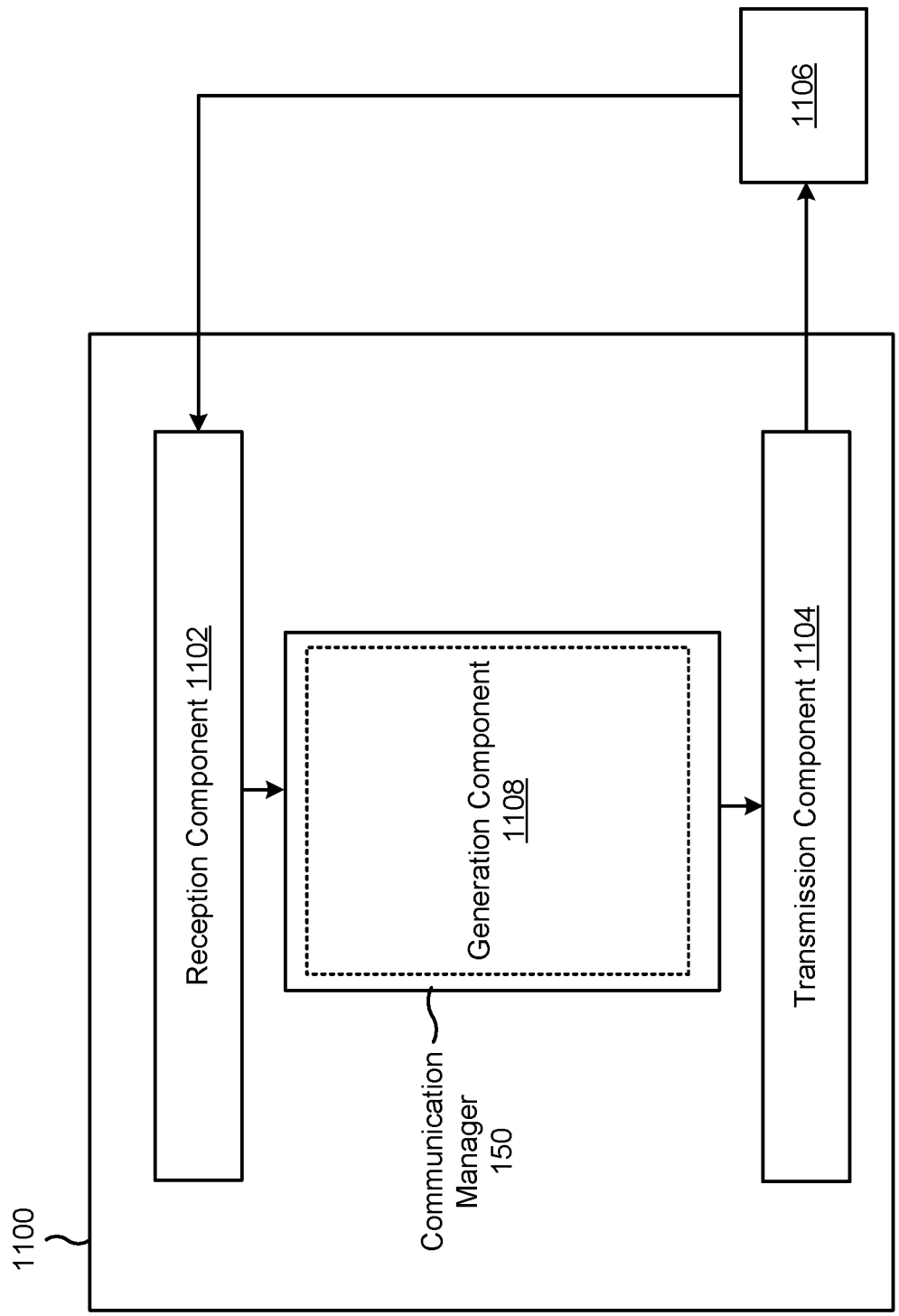
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a generation component 1108, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive, from a UE, an indication that the UE supports a ranging service. The transmission component 1104 may transmit, based at least in part on the indication, a registration message including a decode key associated with the ranging service, an identifier associated with the UE, and an encoded value based at least in part on the decode key.

The generation component 1108 may generate at least one of the encode key, the decode key, or the identifier.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: receiving a registration message including a decode key associated with a ranging service; receiving, from a second UE, an encoded value and an identifier associated with the second UE; validating the identifier using the encoded value and the decode key; and establishing a ranging session associated with the second UE based at least in part on validating the identifier.

Aspect 2: The method of Aspect 1, wherein the registration message including the decode key is based at least in part on an indication that the first UE supports the ranging service.

Aspect 3: The method of any of Aspects 1-2, wherein receiving the encoded value and the identifier is based at least in part on an indication that the first UE supports the ranging service.

Aspect 4: The method of any of Aspects 1-3, wherein the encoded value and the identifier are received in a communication associated with ranging session initialization.

Aspect 5: The method of any of Aspects 1-4, wherein validating the identifier further comprises: decoding the encoded value using the decode key to obtain a decoded value; and determining that the identifier associated with the second UE matches the decoded value.

Aspect 6: The method of any of Aspects 1-5, wherein the identifier is a second identifier and the encoded value is a second encoded value, and wherein the registration message includes a first identifier associated with the first UE and a first encoded value associated with the first UE.

Aspect 7: The method of Aspect 6, further comprising: transmitting the first identifier and the first encoded value to the second UE based at least in part on validating the identifier.

Aspect 8: The method of Aspect 7, wherein the first identifier and the first encoded value are transmitted via a radio resource control reconfiguration complete communication.

Aspect 9: The method of any of Aspects 1-8, wherein the identifier and the encoded value are received via a radio resource control reconfiguration communication.

Aspect 10: The method of any of Aspects 1-9, wherein receiving the encoded value and the identifier further comprises receiving the encoded value and the identifier without an active connection with a network node.

Aspect 11: A method of wireless communication performed by a network node, comprising: receiving, from a user equipment (UE), an indication that the UE supports a ranging service; and transmitting, based at least in part on the indication, a registration message including a decode key associated with the ranging service, an identifier associated with the UE, and an encoded value based at least in part on the decode key.

Aspect 12: The method of Aspect 11, wherein the encoded value is a version of the identifier encoded using an encode key associated with the decode key.

Aspect 13: The method of Aspect 12, further comprising generating at least one of the encode key, the decode key, or the identifier.

Aspect 14: The method of any of Aspects 11-13, wherein the indication is received via capability information.

Aspect 15: The method of any of Aspects 11-14, wherein the identifier is a first identifier, and the encoded value is a first encoded value, and wherein the method further comprises: transmitting, to a second UE, a second registration message including the decode key, a second identifier associated with the second UE, and a second encoded value based at least in part on an encode key associated with the decode key.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory; and
one or more processors, coupled to the memory, configured to:
receive a registration message including a decode key associated with a ranging service;
receive, from a second UE, an encoded value and an identifier associated with the second UE;
validate the identifier using the encoded value and the decode key; and
establish a ranging session associated with the second UE based at least in part on validating the identifier.

2. The first UE of claim 1, wherein the registration message including the decode key is based at least in part on an indication that the first UE supports the ranging service.

3. The first UE of claim 1, wherein receiving the encoded value and the identifier is based at least in part on an indication that the first UE supports the ranging service.

4. The first UE of claim 1, wherein the encoded value and the identifier are received in a communication associated with ranging session initialization.

5. The first UE of claim 1, wherein the one or more processors, to validate the identifier, are configured to:
decode the encoded value using the decode key to obtain a decoded value; and
determine that the identifier associated with the second UE matches the decoded value.

6. The first UE of claim 1, wherein the identifier is a second identifier and the encoded value is a second encoded value, and wherein the registration message includes a first identifier associated with the first UE and a first encoded value associated with the first UE.

7. The first UE of claim 6, wherein the one or more processors are further configured to:
transmit the first identifier and the first encoded value to the second UE based at least in part on validating the second identifier.

8. The first UE of claim 7, wherein the first identifier and the first encoded value are transmitted via a radio resource control reconfiguration complete communication.

9. The first UE of claim 1, wherein the identifier and the encoded value are received via a radio resource control reconfiguration communication.

10. The first UE of claim 1, wherein the one or more processors, to receive the encoded value and the identifier, are configured to receive the encoded value and the identifier without an active connection with a network node.

11. A network node for wireless communication, comprising:
a memory; and
one or more processors, coupled to the memory, configured to:
receive, from a user equipment (UE), an indication that the UE supports a ranging service; and
transmit, based at least in part on the indication, a registration message including a decode key associated with the ranging service, an identifier associated with the UE, and an encoded value based at least in part on the decode key.

12. The network node of claim 11, wherein the encoded value is a version of the identifier encoded using an encode key associated with the decode key.

13. The network node of claim 12, wherein the one or more processors are further configured to generate at least one of the encode key, the decode key, or the identifier.

14. The network node of claim 11, wherein the indication is received via capability information.

15. The network node of claim 11, wherein the identifier is a first identifier, and the encoded value is a first encoded value, and wherein the one or more processors are configured to:
transmit, to a second UE, a second registration message including the decode key, a second identifier associated with the second UE, and a second encoded value based at least in part on an encode key associated with the decode key.

16. A method of wireless communication performed by a first user equipment (UE), comprising:
receiving a registration message including a decode key associated with a ranging service;
receiving, from a second UE, an encoded value and an identifier associated with the second UE;
validating the identifier using the encoded value and the decode key; and
establishing a ranging session associated with the second UE based at least in part on validating the identifier.

17. The method of claim 16, wherein the registration message including the decode key is based at least in part on an indication that the first UE supports the ranging service.

18. The method of claim 16, wherein receiving the encoded value and the identifier is based at least in part on an indication that the first UE supports the ranging service.

19. The method of claim 16, wherein the encoded value and the identifier are received in a communication associated with ranging session initialization.

20. The method of claim 16, wherein validating the identifier further comprises:
decoding the encoded value using the decode key to obtain a decoded value; and
determining that the identifier associated with the second UE matches the decoded value.

21. The method of claim 16, wherein the identifier is a second identifier and the encoded value is a second encoded value, and wherein the registration message includes a first identifier associated with the first UE and a first encoded value associated with the first UE.

22. The method of claim 21, further comprising:
transmitting the first identifier and the first encoded value to the second UE based at least in part on validating the second identifier.

23. The method of claim 22, wherein the first identifier and the first encoded value are transmitted via a radio resource control reconfiguration complete communication.

24. The method of claim 16, wherein the identifier and the encoded value are received via a radio resource control reconfiguration communication.

25. The method of claim 16, wherein receiving the encoded value and the identifier further comprises receiving the encoded value and the identifier without an active connection with a network node.

26. A method of wireless communication performed by a network node, comprising:
    receiving, from a user equipment (UE), an indication that the UE supports a ranging service; and
    transmitting, based at least in part on the indication, a registration message including a decode key associated with the ranging service, an identifier associated with the UE, and an encoded value based at least in part on the decode key.

27. The method of claim 26, wherein the encoded value is a version of the identifier encoded using an encode key associated with the decode key.

28. The method of claim 27, further comprising generating at least one of the encode key, the decode key, or the identifier.

29. The method of claim 26, wherein the indication is received via capability information.

30. The method of claim 26, wherein the identifier is a first identifier, and the encoded value is a first encoded value, and wherein the method further comprises:
    transmitting, to a second UE, a second registration message including the decode key, a second identifier associated with the second UE, and a second encoded value based at least in part on an encode key associated with the decode key.

* * * * *